United States Patent [19]

Martin

[11] 3,884,430

[45] May 20, 1975

[54] TAPE CASSETTE

[75] Inventor: Peter G. Martin, Arlington, Mass.

[73] Assignee: Arthur D. Little, Inc., Cambridge, Mass.

[22] Filed: Dec. 20, 1972

[21] Appl. No.: 317,100

[52] U.S. Cl. .................. 242/199; 226/191; 242/76
[51] Int. Cl.... B65h 17/20; G03b 1/04; G11b 15/32
[58] Field of Search ............ 242/76, 75.3, 197–200; 226/189–191; 29/126–128

[56] References Cited

UNITED STATES PATENTS

| | | | |
|---|---|---|---|
| 2,854,197 | 9/1958 | MacNeill | 242/75.3 |
| 3,001,440 | 9/1961 | Foster | 242/199 |
| 3,380,678 | 4/1968 | Feasey et al. | 226/191 X |
| 3,394,899 | 7/1968 | Schoenmakers | 242/198 |
| 3,423,038 | 1/1969 | Katzef et al. | 242/199 |

*Primary Examiner*—Leonard D. Christian
*Attorney, Agent, or Firm*—Weingarten, Maxham & Schurgin

[57] ABSTRACT

A magnetic tape cassette suitable for high speed data recording and reproduction in which acceleration forces exerted on the tape can cause tape stretching and consequent inaccurate tape motion past a magnetic head. The cassette has at least one compressible elastic roller along the tape travel path between a capstan drive and the tape supply reel, this roller having compressive characteristics operative to effectively shorten the tape travel path and thereby substantially reduce the tensile stresses created in the tape during rapid acceleration. As a result, stretching of the tape is substantially reduced as are undesirable perturbations in the effective velocity of the tape past a tape head.

4 Claims, 4 Drawing Figures

TAPE CASSETTE

FIELD OF THE INVENTION

This invention relates to magnetic tape cassettes and more particularly to magnetic tape cassettes adapted for high acceleration operation.

BACKGROUND OF THE INVENTION

Magnetic tape cassettes are widely employed for audio and data recording and reproduction. One type of tape cassette commonly known as a Philips-type cassette has become fairly standard for both audio and data purposes, the cassettes employed for data recording and reproduction being usually of higher quality construction to meet the more stringent performance requirements of a data system in comparison to an audio system. A Philips-type cassette generally comprises a supply of magnetic recording tape wound on a pair of rotatable reels supported within a generally rectangular housing. The tape extends between the reels and is supported along a travel path by rigid guide rollers affixed to the cassette housing and operative to maintain a length of tape in a linear path near one side of the cassette which is open to permit access to the tape by a drive assembly and one or more tape heads of associated tape transport apparatus. In use, the tape is driven by a capstan drive, the take-up reel also being driven to accommodate the tape being drawn from the supply reel.

For data recording and reproduction, it is usually required that the tape be quickly accelerated to a stable operating speed and then maintained accurately at that speed. Such rapid acceleration can occur in both forward and reverse directions as in data systems the tape is often driven forward and back in start-stop manner. In a conventional cassette, the required rapid acceleration of the tape by the capstan drive causes stretching of the tape initially lying between the capstan and the supply reel. Such stretching is due to the need to accelerate the inertial mass of the tape wound on the supply reel, together with the mass of the reel and coupled external apparatus. A tensile stress is thus caused to occur in the tape resulting in the stretching thereof and causing undesirable perturbations in the effective velocity of the tape passing the magnetic head.

The problems of rapid tape acceleration in data recorders have generally been met by use of mechanical linkages which engage the tape and which are movable under the influence of predetermined tape stresses to minimize tape stretching and spurious tape motion. Such linkages typically include a spring loaded arm mounted at one end for rotation about the mounting axis and having a guide roller at the opposite end engaging the tape, the arm being rotationally movable in response to tape forces greater than the spring bias to counteract the effects of tape stress caused by rapid acceleration. In a cassette recording system, however, such linkages cannot readily be accommodated within a cassette of standardized construction. Moreover, such linkages add to the overall complexity and cost of a cassette, a major advantage of which is its relatively low cost and simplicity.

SUMMARY OF THE INVENTION

In accordance with the present invention, a magnetic tape cassette is provided especially adapted for data recording and reproduction and in which tape speed perturbations caused by tape stretching during high acceleration operation are minimized. Under conditions of rapid acceleration, such as during the initial tape start-up period, the tendency of the tape to stretch is prevented or substantially reduced by employing along the tape travel path one or more compressible elastic rollers within the cassette which yield to a requisite extent in response to predetermined tensile stress exerted on the tape during acceleration. By virtue of the invention, the tensile strength produced by rapid tape acceleration is transferred to a compressive stress in the roller, urging the roller into a configuration which reduces the effective length of the tape travel path. The elasticity and limit of compression of the roller is selected with relation to the elasticity of the magnetic tape to effectively counteract the tendency of the tape to stretch materially under high acceleration forces encountered during operation. The roller is of sufficient stiffness to not materially deform in the presence of lesser tape forces encountered during steady state operation.

DESCRIPTION OF THE DRAWINGS

The invention will be more fully understood by reference to the following detailed description taken in conjunction with the accompanying drawings, in which.

DETAILED DESCRIPTION OF THE INVENTION

Figure 1:
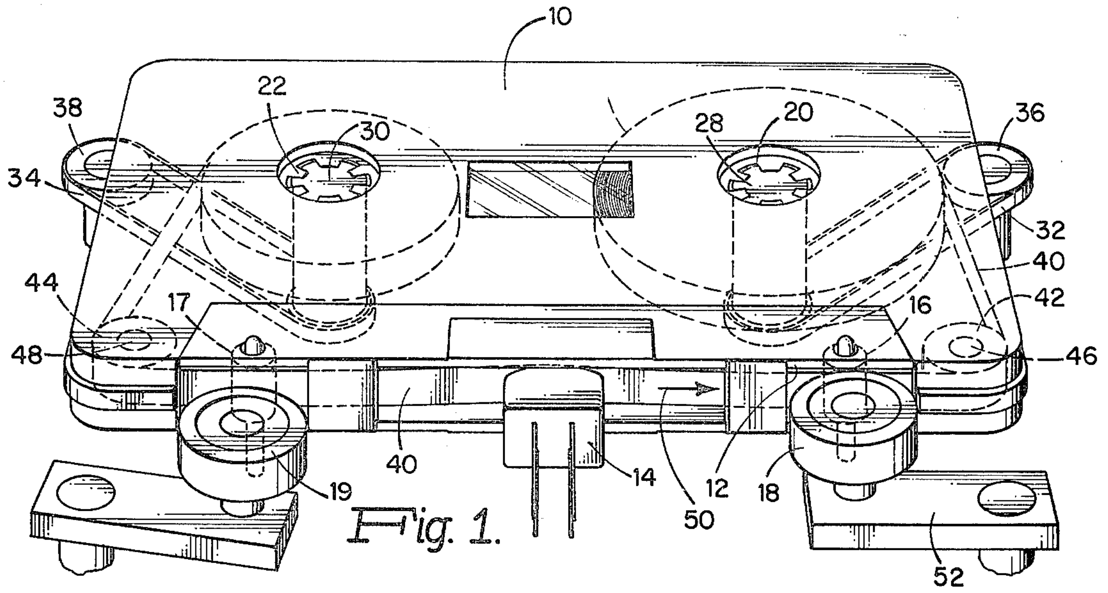
FIG. 1 is a partially cutaway pictorial view of a Philips-type cassette embodying the invention and associated portion of a typical tape transport.

A typical Philips-type cassette embodying the invention is shown in FIG. 1 and includes a housing 10 of generally rectangular configuration and substantially enclosed except for an open portion 12 confronting one or more external magnetic heads 14 and first and second external capstan drives comprising a capstan 16 and associated pinch roller 18, and a capstan 17 and associated pinch roller 19. Tape storage reels 20 and 22 are retained in adjacent spaced relation within housing 10 and are rotatable about respective axes orthogonal to the plane of the cassette, and removably coupled to an associated tape transport system, typically by spindles 28 and 30. The spindles are each driven by an associated belt 32 and 34 and pulley 36 and 38 which, in turn, are driven by a suitable motor source. A supply of magnetic tape 40 is wound on reels 20 and 22 and extends between the reels along a predetermined tape travel path which includes the exposed housing portion 12. A pair of compressible elastic rollers 42 and 44 are disposed in respective corner portions of housing 10 and are rotatable about respective pins 46 and 48 mounted to the housing. The tape 40 extends from reel 20 over compressible roller 42, between capstan 16 and pinch roller 18, between capstan 17 and pinch roller 19, and thence over compressible roller 44 to reel 22.

For tape motion in the direction illustrated by arrow 50 in FIG. 1, the tape is caused to engage capstan 16 by action of pinch roller 18 which is urged into engagement with the confronting surface of the tape such as by a spring loaded arm 52 of the tape transport apparatus. Pinch roller 19 remains disengaged. The reel 20, for this direction to tape motion, functions as a take-up reel and is driven via pulley 36 and belt 32 to accommodate the tape being transported by the driven capstan assembly. The supply reel 22 is usually not driven and is allowed to freely rotate to pay out the tape being transported by the capstan drive. For movement of the tape in a direction opposite to arrow 50, the pinch roller 19 is caused to engage tape 40 to permit the driving thereof by capstan 17. The pinch roller 18 in this operation is disengaged from the tape surface. Reel 22 is driven to provide take-up of the driven tape while reel 20 freely rotates to supply tape being driven.

During the start-up period within which the tape is accelerated to a constant operating velocity, the acceleration forces exerted on the tape between the driving capstan and the supply reel, and which can cause stretching of the tape in a cassette of conventional construction, are minimized by the yieldable character of the rollers 42 and 44. Such tape stress is caused by acceleration of the inertial mass of the supply reel and tape wound thereon together with the associated apparatus coupled thereto. The portion of tape passing the capstan thus accelerates at a faster rate than the supply reel and associated structure, resulting in stretching of the tape which can produce perturbations in tape motion past the magnetic head.

Figure 2:
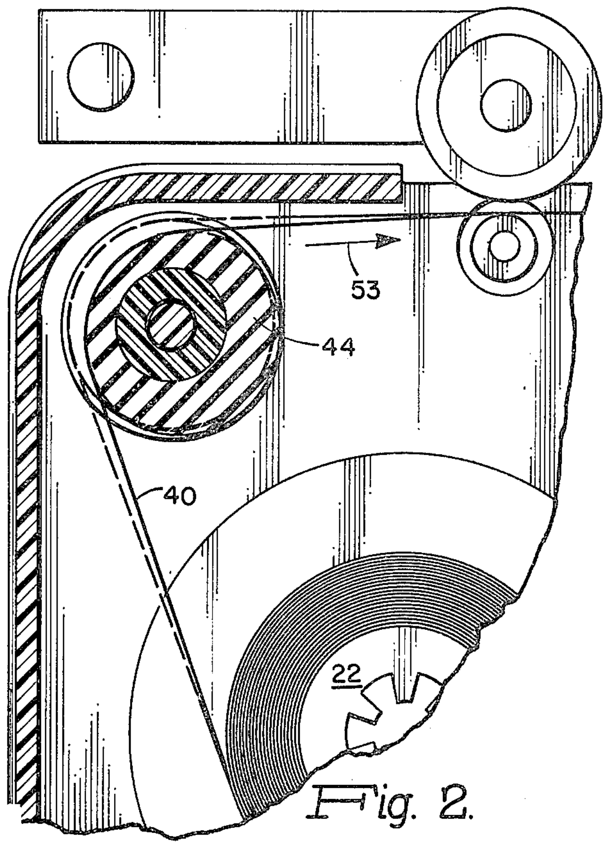
FIG. 2 is a cutaway plan view of a portion of the cassette of FIG. 1 illustrating operation of the invention during tape acceleration.

The operation of the invention in minimizing the effect of rapid tape acceleration is depicted in FIG. 2. The tape 40 is shown being driven in the direction of arrow 53 by operation of capstan 16 and associated pinch roller 18. During the acceleration period, the roller 44 is compressed into a deformed non-round configuration illustrated to effectively shorten the length of the tape travel path between the driving capstan and supply reel 22, and to compensate for the tensile stresses induced in tape 40 which could otherwise cause stretching of the tape. When steady state operative velocity is reached, the compressed roller 44 returns to its original configuration, as illustrated in dotted outline in FIG. 2, since during such steady state operation the tensile stresses in the tape sufficient to cause tape stretching have ceased to be present.

In a cassette recorder employed for data recording and reproduction purposes, the acceleration time is typically specified to be of the order of 50 milliseconds, after which time the tape should be transported past head 14 at a substantially constant operating speed. However, in tape cassettes of conventional construction in which the guide rollers are of rigid construction, tape speed variations of significant magnitude exist for an additional time interval after the specified start-up period, which additional time interval can be as long or longer than the start-up interval itself, with tape speed variations being as great as 20 percent during such time.

By virtue of the invention, tape speed variations during initial acceleration are markedly reduced by compressible resilient rollers 42 and 44. The elasticity and compressive limit of the material comprising rollers 42 and 44 is predetermined with respect to the elasticity of tape 40 to cause compression of the operative roller in the presence of a selected tensile stress which would otherwise cause stretching of the tape. A typical polyester base magnetic tape has a Young's modulus of about $4 \times 10^5$ psi. The rollers 42 and 44 include a resilient component having a substantially lower Young's modulus of elasticity. Natural rubber, for example, has a modulus of about 100 psi, while synthetic materials such as polyisobutylene exhibits an even lower Young's modulus. Thus, tape guide rollers 42 and 44 having a significantly lower elasticity than tape 40 are caused to yield during the tape start-up interval in which acceleration forces are present to cause compression of the operative guide roller rather than stretching of the tape. The rollers are of sufficient stiffness to not materially deform during steady state operation; that is, during driving of the tape at constant velocity.

Figure 3:
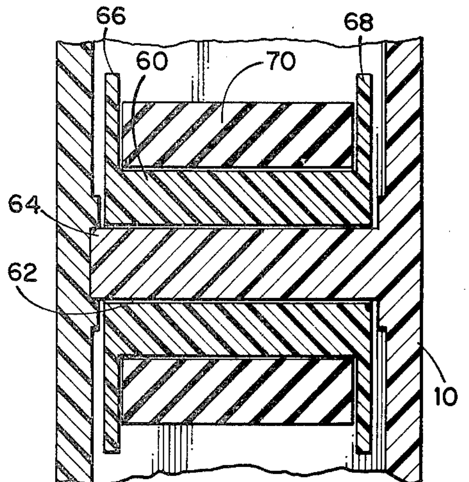
FIG. 3 is a sectional elevation view of one embodiment of a tape roller according to the invention.

The construction of a typical embodiment of rollers 42 and 44 is shown in FIG. 3 and includes a cylindrical hub portion 60 having a centrally disposed opening 62 therethrough adapted for rotation about a mounting pin 64 which is affixed to the cassette housing 10. First and second peripheral flanges 66 and 68 are integrally formed with hub 60 and define a circumferential channel in which a compressible resilient annular member 70 is disposed. The hub 60 and flanges 66 and 68 are typically formed of a suitable plastic material such as nylon, while the resilient member 70 is typically a natural synthetic rubber having requisite elasticity compared to that of the magnetic tape employed in the cassette. The flanges 66 and 68 extend outwardly beyond the cylindrical outer surface of member 70 to serve as guides for the tape passing over member 70. The resilient member 70 rotates with hub 60 and has a flat circumferential surface for engaging the tape.

Figure 4:
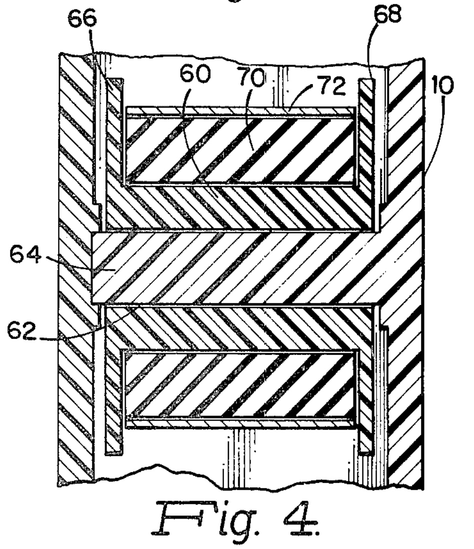
FIG. 4 is a sectional elevation view of another embodiment of a tape roller according to the invention.

An alternative embodiment of the compressive resilient guide roller is depicted in FIG. 4 and includes, in addition to the structure discussed in conjunction with FIG. 3, a sleeve 72 of a suitable material typically nylon which is disposed around the circumferential outer surface of resilient member 70 and rotatable as a unit therewith. The sleeve 72 has surface characteristics harder than those of member 70 and serves to provide good wear resistance to the passage of the magnetic tape thereover, and to reduce wear of the resilient member.

It will be appreciated that the invention can be implemented by different materials and by use of different constructional approaches. Accordingly, it is not intended to limit the invention by what has been particularly shown and described except as indicated in the appended claims.

What is claimed is:

1. A magnetic tape cassette comprising:

a substantially enclosed generally rectangular housing having an open portion along one side thereof;

first and second tape storage reels disposed in said housing for rotation about respective parallel axes thereof;

means associated with at least one of said storage reels and adapted to be coupled to drive means external of said housing and operative to provide rotary motion of the reel serving as a take-up reel;

a supply of magnetic recording tape carried by said storage reels;

means supported by said housing for disposing the portion of said tape between said reels for motion in a predetermined travel path within said housing and along the open portion thereof;

said tape being driven at the open portion of said housing by a capstan drive assembly external of said housing and cooperative with said tape, and a portion of said tape along the open portion of said housing being arranged for operative association with a magnetic head;

said tape disposing means including at least one compressible elastic roller disposed at a fixed position within said housing at a corner portion thereof and along said travel path between said capstan drive assembly and said storage reel from which tape is drawn, said at least one compressible elastic roller always engaging said tape and over which said tape extends in said travel path;

said at least one roller being bidirectionally rotatable and operative to rotate about its axis at said fixed position as said tape moves through said path, and being elastically compressible in response to a predetermined tensile stress in said tape caused by rapid tape acceleration, said elastic compression being operative to reduce the length of said tape travel path between said capstan drive assembly and said storage reel from which tape is drawn by an amount sufficient to at least partially compensate for the effects of tensile stress in said tape caused by acceleration forces;

said at least one roller including:

a cylindrical hub of rigid material supported for rotation about its axis by said housing;

a pair of peripheral circular flanges on said hub and rotatable with said hub in fixed radial relationship therewith and defining an annular channel around said hub and between said flanges; and a ring of compressive elastic material disposed around said hub within said channel and operative for rotation with said hub and elastically compressible in relation to said fixed flanges and hub.

2. A magnetic tape cassette according to claim 1 wherein said at least one roller is of a stiffness to not materially deform during constant velocity movement of said tape through said travel path.

3. A magnetic tape cassette according to claim 1 wherein said at least one roller includes:

first and second compressible elastic rollers each operative to elastically compress in response to tensile stress in said tape caused by acceleration forces; and means for mounting each of said rollers at a respective corner portion of said housing in a position to dispose a portion of the tape along said travel path near said open portion of said housing at which said tape is accessible to said magnetic head and said capstan drive assembly.

4. A magnetic tape cassette according to claim 1 wherein said at least one roller includes a sleeve provided around said compressive elastic ring and of a material having good wear resistance to the passage of said tape thereover.

* * * * *